(12) United States Patent
Levy

(10) Patent No.: US 11,204,513 B2
(45) Date of Patent: Dec. 21, 2021

(54) INTEGRATED FREQUENCY REFERENCING SYSTEM

(71) Applicant: Yissum Research Development Company of the Hebrew University of Jerusalem Ltd., Jerusalem (IL)

(72) Inventor: Uriel Levy, Kiriat Ono (IL)

(73) Assignee: YISSUM RESEARCH DEVELOPMENT COMPANY OF THE HEBREW UNIVERSITY OF JERUSAMEM LTD, Jerusalem (IL)

(*) Notice: Subject to any disclaimer, the term of this patent is extended or adjusted under 35 U.S.C. 154(b) by 0 days.

(21) Appl. No.: 16/865,793

(22) Filed: May 4, 2020

(65) Prior Publication Data

US 2020/0348544 A1 Nov. 5, 2020

Related U.S. Application Data

(60) Provisional application No. 62/842,570, filed on May 3, 2019.

(51) Int. Cl.
| | | |
|---|---|---|
| *G02F 1/035* | (2006.01) | |
| *G02F 1/025* | (2006.01) | |
| *G02F 1/01* | (2006.01) | |

(52) U.S. Cl.
CPC .......... *G02F 1/025* (2013.01); *G02F 1/0121* (2013.01)

(58) Field of Classification Search
CPC ............................... G02F 1/025; G02F 1/0121
See application file for complete search history.

(56) References Cited

U.S. PATENT DOCUMENTS

| | | | | |
|---|---|---|---|---|
| 8,588,557 B2* | 11/2013 | Schmidt | ............... | B32B 37/1018 |
| | | | | 385/12 |
| 2008/0278710 A1* | 11/2008 | Schmidt | .................. | G02B 6/10 |
| | | | | 356/73 |
| 2009/0022201 A1* | 1/2009 | Krupke | ................. | H01S 3/0941 |
| | | | | 372/75 |

(Continued)

OTHER PUBLICATIONS

W. Loh, M. T. Hummon, H. F. Leopardi, T. M. Fortier, F. Quinlan, J. Kitching, S. B. Papp, and S. A. Diddams, "Microresonator Brillouin laser stabilization using a microfabricated rubidium cell," Opt. Express 24, 14513 (2016).

(Continued)

*Primary Examiner* — Ellen E Kim
(74) *Attorney, Agent, or Firm* — Browdy and Neimark, P.L.L.C.

(57) ABSTRACT

The present invention relates to an integrated frequency referencing system. The integrated frequency referencing control system comprises inter alia a substrate and an optical pathway being integrated on the substrate and being configured and operable to enable propagation for light signals. The optical pathway comprises an electro-optic modulator structure being configured and operable to impart a unique identification modulation to at least one input optical signal emitted by the light source, at least one optical dielectric waveguide being configured and operable to enable confinement and propagation of the at least one input modulated optical signal therethrough, and an atomic vapor cell accommodating atoms or molecules providing at least one atomic or molecular transition.

18 Claims, 5 Drawing Sheets
(5 of 5 Drawing Sheet(s) Filed in Color)

(56) References Cited

U.S. PATENT DOCUMENTS

2013/0003766 A1    1/2013  Savchenkov et al.
2014/0028405 A1*  1/2014  Hong et al.
2016/0291549 A1*  10/2016  Herbsommer ......... G01N 29/36
2017/0146958 A1*  5/2017  Gallinet .................... H03L 7/26
2018/0373118 A1*  12/2018  Kiffner ................ G02F 1/3536

OTHER PUBLICATIONS

L. Stern, B. Desiatov, I. Goykhman, and U. Levy, "Nanoscale light-matter interactions in atomic cladding waveguides.," Nat. Commun. 4, 1548 (2013).

R. Holzwarth, "Optical frequency metrology," 416, 233-237 (2002).

S. B. Papp, K. Beha, P. Del'Haye, F. Quinlan, H. Lee, K. J. Vahala, S. a. Diddams, P. Del'Haye, F. Quinlan, H. Lee, K. J. Vahala, and S. a. Diddams, "Microresonator frequency comb optical clock," Optica 1, 10-14 (2014).

Knappe, V. Shah, P. D. D. Schwindt, L. Hollberg, J. Kitching, L. A. Liew, and J. Moreland, "A microfabricated atomic clock," Appl. Phys. Lett. 85, 1460-1462 (2004).

Benabid, P. Light, F. Couny, and P. Russell, "Electromagnetically-induced transparency grid in acetylene-filled hollow-core PCF.," Opt. Express 13, 5694-5703 (2005).

James M. Supplee, Edward A. Whittaker, and Wilfried Lenth"Theoretical description of frequency modulation and wavelength modulation spectroscopy", Applied Optics, vol. 33, No. 27, Sep. 20, 1994.

* cited by examiner

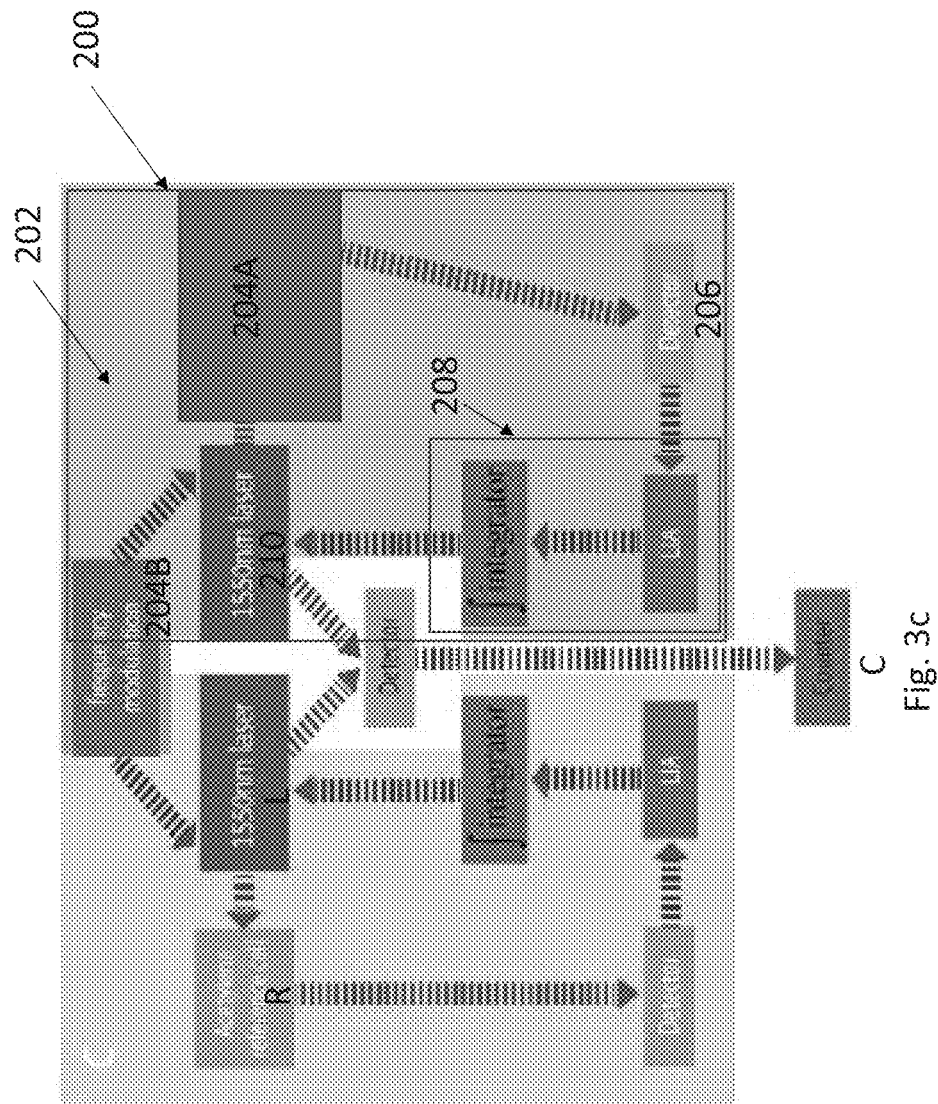

INTEGRATED FREQUENCY REFERENCING SYSTEM

TECHNOLOGICAL FIELD

The present invention relates to frequency referencing by using a photonic chip-scale system.

BACKGROUND ART

References considered to be relevant as background to the presently disclosed subject matter are listed below:
1. W. Loh, M. T. Hummon, H. F. Leopardi, T. M. Fortier, F. Quinlan, J. Kitching, S. B. Papp, and S. A. Diddams, "Microresonator Brillouin laser stabilization using a microfabricated rubidium cell," Opt. Express 24, 14513 (2016).
2. L. Stern, B. Desiatov, L Goykhman, and U. Levy, "Nanoscale light-matter interactions in atomic cladding waveguides.," Nat. Commun. 4, 1548 (2013).
3. R. Holzwarth, "Optical frequency metrology," 416, 233-237 (2002).
4. S. B. Papp, K. Beha, P. Del'Haye, F. Quinlan, H. Lee, K. J. Vahala, S. a. Diddams, P. Del'Haye, F. Quinlan, H. Lee, K. J. Vahala, and S. a. Diddams, "Microresonator frequency comb optical clock," Optica 1, 10-14 (2014).
5. US Patent publication No. 2014/028405
6. US Patent publication No. 2013/003766
7. US Patent publication No 2016/291549

Acknowledgement of the above references herein is not to be inferred as meaning that these are in any way relevant to the patentability of the presently disclosed subject matter.

BACKGROUND

Wavelength, frequency and time referencing are desired for a variety of applications, related to navigation, communication, positioning location, as well as for accurate measurements of fundamental physical constants such as gravity. Many of the simple referencing systems are based on oscillators such as quartz oscillators. However, the accuracy of such oscillators is limited, in particular at long time scales. A much more accurate alternative is based on atomic transitions, e.g. by using atoms such as rubidium or cesium. There is a need to overcome the above-mentioned limitations, by providing a simpler solution.

GENERAL DESCRIPTION

The present invention is based on the use of integrated optics, which is fully integrated with a vapor cell. According to a broad aspect of the present invention there is provided an integrated frequency referencing system. The integrated frequency referencing system of the present invention can be implemented at low cost and can be used as a high-performance system for frequency referencing. The integrated frequency referencing system comprises inter alfa a substrate and an optical pathway being integrated on the substrate and being configured and operable to enable propagation for light signals. The optical pathway comprises an electro-optic modulator structure being configured and operable to impart a unique identification modulation to at least one input optical signal emitted by the light source. The electro-optic modulation may be implemented within the light source providing a direct modulation or may be an external electro-optic modulator structure integrated on the chip and coupled to the output of the light source. In other words, the integrated electro-optic modulator structure comprises an electro-optic modulator external to at least one light source wherein the external electro-optic modulator is integrated to the substrate; an electro-optic modulator internal to at least one light source wherein the at least one light source and the internal electro-optic modulator are integrated to the substrate or all the electronics related to modulation being integrated to the substrate. The optical pathway also comprises at least one optical dielectric waveguide being configured and operable to enable confinement and propagation of the at least one input modulated optical signal therethrough and an atomic vapor cell accommodating atoms or molecules providing at least one atomic or molecular transition. The atomic vapor cell is optically coupled to receive the at least one input modulated optical signal from the optical waveguide and is configured and operable to produce a frequency reference signal corresponding to at least one atomic or molecular transition. The output of the integrated frequency referencing system is an accurate frequency reference which can be used to be compared with a source or for other needs (e.g. measurements). The integrated frequency referencing system is configured and operable to maintain the at least one input optical signal at a substantially constant reference frequency. The modulator function (i.e. the electro-optic modulator, the modulated light source with an internal electro-optic modulator or all the electronics related to the modulation), the atomic vapor cell and the optical waveguide are rigidly coupled to the substrate, forming together a photonic chip scale integrated cell. The invention thus provides inter alia a photonic chip comprising an atomic vapor cell integrated within an optical waveguide by bonding. More specifically, the frequency referencing system of the present invention is fully integrated and comprises the atomic vapor cell and the optical waveguide in the same arrangement. The waveguide is configured to allow interrogation of the atoms that reside within the same chip. It should be understood that the integrated frequency referencing system of the present invention enables to provide both optical signal and electrical signal processing functions on the same substrate. This unique feature enables to perform frequency referencing of a light source at high performance and with low power consumption. Moreover, such configuration being integrated on a chip enables to provide high tunability and highly stability, as well as compactness. The frequency referencing system provides a variation in the tuning characteristics of the light source by operating as a feedback control system. If the light source is a tunable laser or a laser diode, or VCSEL, the frequency referencing system enables such a light source to be used in applications where precise frequency control must be maintained. A frequency stable, tunable laser module, whose output frequency does not change over time, is then obtained. The frequency referencing system enables to stabilize the laser in order to generate a frequency reference. Using feedback on the output frequency, it is possible to lock the light source at the optimum operating point for a given wavelength. The frequency referencing system may be used to implement optical modulation techniques in data communication systems. Such a system, being based on optical data communication between chips or within a chip based on silicon photonics technology, may be integrated in high performance and high-speed computer systems, high-capacity data communication systems, and image processing systems. Alternatively, the light source may be vertical external cavity surface emitting lasers (VECSELs) excited by optical or electrical pumping. Such configuration enables to provide VECSELs which are tunable, which may be made stable at one of a selectable plurality of modes, and which are more readily fabricated, and with less complexity than prior approaches.

In some embodiments, the atomic vapor cell is arranged on the top of the at least one optical waveguide. The atomic vapor (i.e. atoms or molecules in the gas phase) can be the cladding of the waveguide. More specifically, the atomic vapor cell may be arranged on the top or aside of a core of the at least one optical waveguide, such that the atomic vapor is configured for operating as a cladding of the optical mode of at least one optical waveguide. The atomic vapor cell may comprise acetylene molecules providing a plurality of molecular transitions corresponding to a plurality of absorption lines in the electromagnetic spectrum of telecommunication. Alternatively, the atomic vapor cell may comprise/contain a solid source of alkali vapor capable of being optically activated. The optical coupling between the atomic vapor cell and the at least one optical waveguide may comprise an interaction between an optical mode in the optical waveguide and vapor atoms or molecules via an evanescent tail of the optical mode. The at least one optical waveguide may comprise an interaction region being configured to couple the optical signal from the interaction region to the atomic vapor cell and back to the waveguide adiabatically.

In some embodiments, the frequency referencing system integrates on the same chip at least one optical waveguide, the vapor cell, a photodetector, and electronics. More specifically, the photonic chip scale integrated cell may further comprise a photodetector being configured and operable to collect the frequency reference signal. The photodetector may be bonded or integrated to the substrate. The photonic chip scale integrated cell may further comprise the at least one light source being configured and operable for emitting the light signals. The at least one light source may be bonded or integrated to the substrate. The photonic chip scale integrated cell may further comprise a feedback drive circuit being responsive to the output signals from the photodetector to control at least one of a phase, frequency and amplitude of the signal emitted by the at least one light source. The at least one light source may comprise a laser emitting at least one input signal being coupled to the optical pathway. The frequency referencing system may be then configured and operable to lock at least one of the frequencies of the at least one input signal to a specific frequency corresponding to the atomic or molecular transition. The feedback drive circuit may be then configured to control at least one of a phase, frequency, and amplitude of the signal emitted by the laser.

In some embodiments, the photonic chip scale integrated cell further comprises a heater being configured for heating the atomic vapor cell. The heater may be bonded or integrated to the substrate.

In some embodiments, the photonic chip scale integrated cell further comprises a temperature controller controlling the temperature and/or the atomic density of the vapor cell. The temperature controller may be bonded or integrated to the substrate.

BRIEF DESCRIPTION OF THE DRAWINGS

The patent or application file contains at least one drawing executed in color. Copies of this patent or patent application publication with color drawings will be provided by the Office upon request and payment of the necessary fee.

In order to better understand the subject matter that is disclosed herein and to exemplify how it may be carried out in practice, embodiments will now be described, by way of non-limiting example only, with reference to the accompanying drawings, in which:

FIG. 2b is a micrograph of the system of the example shown in FIG. 2a;

FIG. 2e is a graphical representation showing the measured light transmission from the system of the example shown in FIG. 2a;

FIG. 3a is a graphical representation showing a normalized transmission from the reference cell and the system of the example shown in FIG. 2a;

FIG. 3c is a schematic illustration of another non-limiting example of the integrated frequency referencing system implemented for laser locking according to some embodiments of the present invention.

DETAILED DESCRIPTION OF EMBODIMENTS

Figure 1:
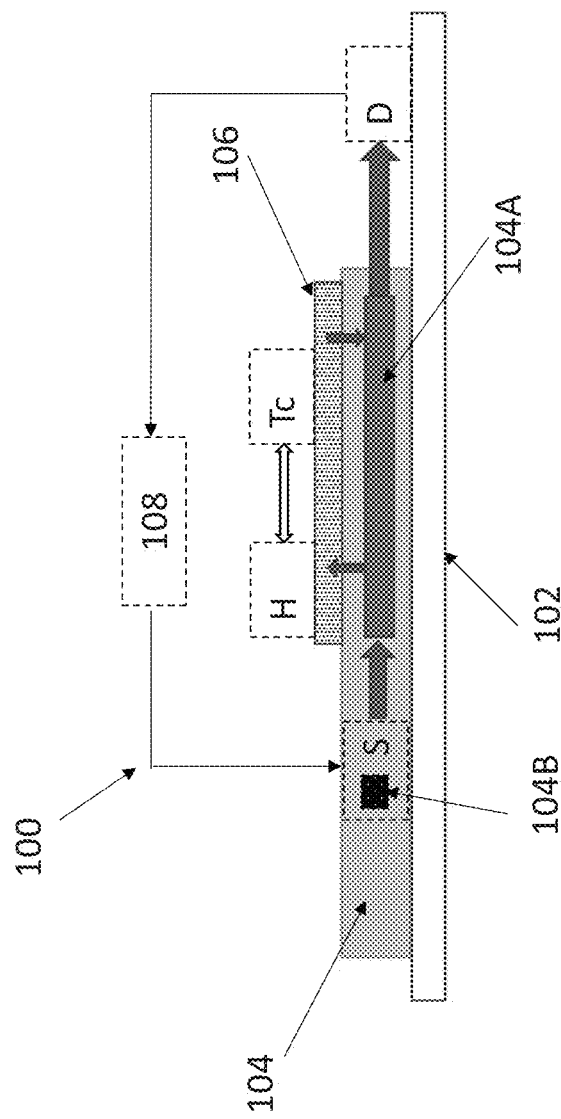
FIG. 1 is a block diagram of an integrated frequency referencing system of the present invention.

Referring to FIG. 1, there is illustrated, by way of a schematic block diagram, an integrated frequency referencing system 100 of the present invention. Integrated frequency referencing system 100 may include any photonic integrated circuits (PICs) generally integrating multiple photonic devices and respective photonic functions in the same chip, e.g., within the device layer(s) of a silicon on insulator (SOI) substrate with bonded III-V material. The chip can be packaged in a standard package. Schemes such as Doppler free saturated spectroscopy can be implemented, e.g. by allowing the light to counter propagate in the waveguides and by designing a 3-port or 4-port system. Fabrication of photonic devices is typically a multi-step process that includes patterning of a substrate with nano- and microstructures. Patterning may be achieved by a lithographic technique such as UV lithography, laser direct write lithography, nanoimprinting, focused ion beam, electron beam lithography or the like. Frequency referencing system 100 is implemented by integrating optical and electronic chips, forming a hybrid, VLSI-photonic integrated circuit using wafer bonding or direct integration. Frequency referencing system 100 may be implemented by a photonic chip scale integrated cell comprising a plurality of layers deposited on a substrate 102. Substrate 102 may be a silicon (Si) optical bench. On a silicon optical bench, various components, such as laser diodes, photodetectors, waveguides, and VLSI chips, may be each picked, aligned, placed, and bonded onto substrate 102 using flip chip technology and, more particularly, using solder bumps. Alternatively, some optical or electrical components can be fully integrated within the substrate 102 by creating patterned components having such optical or electrical functionality.

Integrated frequency referencing system 100 comprises an optical pathway 104 being integrated on substrate 102 and being configured and operable to enable propagation for light signals. Optical pathway 104 includes the different paths through which the light signals propagate. The different paths include those coupling between the different optical elements such as the light source, the waveguide, the photodetector, the external modulator if any, the feedback drive circuit . . . Optical pathway 104 comprises an electro-optic modulator structure 104B being optically coupled to a light source (i.e. being integrated to the light source or being coupled externally) and being configured and operable to create a spectrally modulated light being generated by including a time-dependent phase and/or amplitude shift. When the electro-optic modulator structure 104B is external to the light source, it may be implemented by PN junction silicon optical modulators, hybrid semiconductor on silicon modulators. Electrooptic modulator structure 104B is configured and operable to impart a unique identification modulation to the input light signal. Optical pathway 104 comprises at least one optical dielectric waveguide 104A formed on substrate 102 and an atomic vapor cell 106 accommodating atoms or molecules providing at least one atomic or molecular transition. Optical waveguide 104A is configured and operable to receive the spectrally modulated light, to enable confinement and propagation of the spectrally modulated light therethrough, and to create an interaction between the spectrally modulated light and the atomic vapor cell 106. After interaction with the atomic vapor cell 106, the spectrally modulated light may be detected by a photodetector to analyze the absorption lines. Modulator structure 104B, atomic vapor cell 106 and optical waveguide 104A form an integral part of the system and are rigidly coupled (bonded or embedded) to substrate 102 forming together a photonic chip scale integrated cell. More specifically, vapor cell 106 may be bonded to the chip e.g. by anodic bonding, oxide to oxide bonding, or gluing. Waveguide 104A may be integrated on a SOI portion locally formed on the bulk silicon substrate 102. Moreover, integrated frequency referencing system 100 may be coupled to a feedback drive circuit 108 enabling to maintain the at least one input optical signal at a substantially constant reference frequency. More specifically, the photonic chip scale integrated cell may further comprise a feedback drive circuit 108 being responsive to the output signals from the photodetector to control at least one of a phase, frequency and amplitude of the signal emitted by the at least one light source. The at least one light source may comprise a laser emitting at least one input signal being coupled to the optical pathway. The frequency referencing system 100 may be then configured and operable to lock at least one of the frequencies of the at least one input signal to a specific frequency corresponding to the atomic or molecular transition. The feedback drive circuit 108 may be then configured to control at least one of a phase, frequency and amplitude of the signal emitted by the laser.

As described above, in one embodiment, integrated frequency referencing system 100 is coupled to at least one light source S being configured and operable for emitting input light signals via electrooptical modulator structure 104B (external or internal to the light source S). Light source S light source may bond to substrate 102. Alternatively, light source S may be integrated to substrate 102. In this case, light source S may be based on an III-V compound semiconductor light source for generating an optical input signal.

The optical input signal is coupled to the frequency referencing system 100 using known methods such as "butt" coupling, or grating coupling from fiber or free space. Alternatively, the optical input signal can be coupled directly from a laser that is bonded to the substrate 102. Atomic vapor cell 106 is optically coupled to receive the optical signal from optical waveguide 104 and is configured and operable to produce the frequency reference signal (i.e. output light carrying information of the atomic or molecular transition). The frequency reference signal can be coupled to a photodetector D which may also be either bonded to the substrate 102 or implemented as a photodiode being integrated in substrate 102. Therefore, in some embodiments, integrated frequency referencing system 100 further comprises at least one of a photodetector D being configured and operable to collect the output light. Integrated frequency referencing system 100 may be used as an optical transmitter or coupled with lasers for their wavelength stabilization.

As illustrated in FIG. 1, atomic vapor cell 106 may be arranged on top of the at least one optical waveguide 104. However, system 100 is not limited to this configuration. Waveguide 104 may be configured as a conventional waveguide having a core through which the optical signal propagates and a cladding surrounding the core. For example, waveguide 104 can be constructed of, e.g. silicon nitride, on top of air vacuum or on top of silicon oxide substrate. The atomic vapor cell may be placed on top or aside of the cladding. Alternatively, the atom or the molecule of the atomic vapor cell may operate as a cladding of the at least one optical waveguide.

The optical coupling between the atomic vapor cell 106 and the at least one optical waveguide 104 may comprise an interaction between an optical mode in the optical waveguide and vapor atoms or molecules via an evanescent tail of the optical mode. in other words, the optical mode in the waveguide 104 may interact with the vapor 106 via the evanescent tail of the optical mode which is extended beyond the core of the waveguide 104. Alternatively, the at least one optical waveguide comprises an interaction region being configured to couple the optical signal from the interaction region to the atomic vapor cell and back to the waveguide adiabatically. To this end, the waveguide shape can be adiabatically tailored to couple the light from the waveguide 104 to the vapor cell 106 and back to the waveguide 104. This can be done, for example, by configuring the waveguide as an inverse taper, where the waveguide core dimension is gradually tapered down such that the mode resamples the mode of light propagating in free space. Similar taper can be used to couple light back into the waveguide after being exposed to the atoms or the molecules within the cell.

The vapor cells can be filled with e.g. rubidium, cesium or any other alkali vapor. Alternatively, one may consider filling the cell with a molecule such as acetylene with the advantage of having many absorption lines in the telecom band. More specifically, acetylene molecules provide a plurality of molecular transitions corresponding to a plurality of absorption lines in the electromagnetic spectrum of telecommunication as well as in other spectral regions. Following the completion of the system of the present invention, the vapor cell can be purged and baked, and the alkali vapor can be inserted, followed by pinching of the cell. Alternatively, the atomic vapor cell may be filled with a solid source of alkali vapor. The solid source of alkali vapor may be enclosed in a vessel (e.g. pill) containing the hot vapor. The vessel can be activated thermally, e.g. by laser radiation.

Assuming the cell is filled with alkali atoms, the atomic density of the vapor cell 106 can be controlled by temperature, which sets the vapor pressure. The higher the temperature, the higher the vapor pressure and the optical density of the vapor cell 106. in some embodiments, integrated frequency referencing system 100 further comprises a heater H being configured for heating the atomic vapor cell. Heater H may be an electronic component bonded to substrate 102. Alternatively, heater H may be a CMOS-compatible heater integrated to the substrate 102. Heater H may be an electric heater converting electrical energy to heat energy. The temperature of heater H is selected according to the required atomic density of the vapor cell for each specific application and types of molecules used. Additionally, or alternatively, integrated frequency referencing system 100 further comprises a temperature controller Tc being configured and operable to control the temperature of vapor cell 106. Temperature controller Tc may be an electronic component bonded to substrate 102. Alternatively, temperature controller Tc may be a thermoelectric module integrated to the substrate 102. Temperature controller Tc may automatically adjust the settings of heater H. Temperature controller Tc comprises a temperature control circuit being configured for controlling at least one of a temperature and an atomic density of the atomic vapor cell. Heater H and/or temperature controller Tc can be externally coupled to the integrated frequency referencing system 100. Alternatively, heater H and/or temperature controller Tc can be fully integrated as electronic devices onto substrate 102 forming an integrated chip. Fully integrating heater H and/or temperature controller Tc to substrate 102 enables to improve the accuracy of the frequency referencing because of elimination of the loss of the optical signal being emitted and transmitted externally to the system.

Various examples were carried out to prove the embodiments claimed in the present invention. Some of these experiments are referred to hereinafter. The inventor integrated an atomic vapor cell containing acetylene with optical waveguides into a chip scale photonic system for telecom frequency referencing. Acetylene ($^{12}C_2H_2$) is known to have many transitions in the telecom regime, making it a known reference for telecommunication systems. in this specific and non-limiting example, the integrated frequency referencing system is implemented as a Molecular Cladded Waveguide (MCWG) and is used to lock a telecom laser to a molecular line. The functionality of the 20 hybrid molecular-photonic chip was demonstrated by locking a telecom laser to a molecular line.

Figure 2A:
FIG. 2a is a schematic illustration of a non-limiting example of the integrated frequency referencing system of the present invention.
Figure 2B:
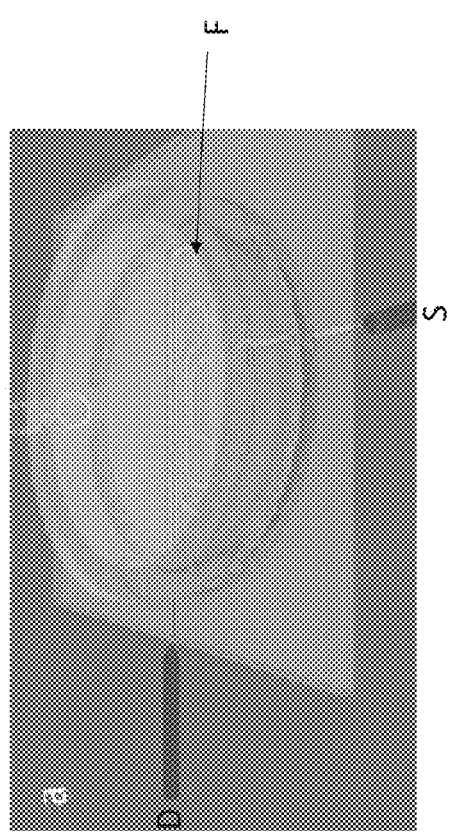
Figure 2C:
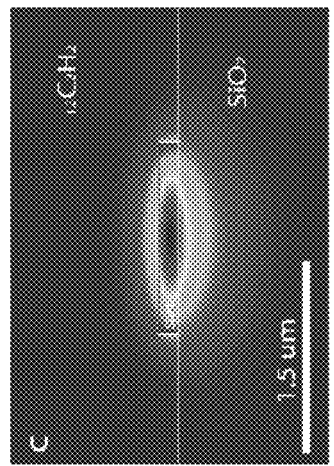
FIG. 2c is a graphical representation showing a cross section of the TE mode distribution of a non-limiting example of an optical waveguide which is a part of the frequency reference system of the present invention.
Figure 2D:
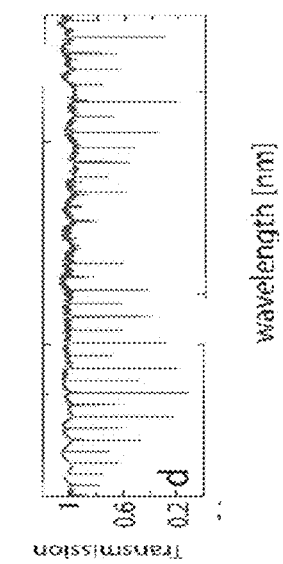
FIG. 2d is a graphical representation showing the measured light transmission from an acetylene reference cell.
Figure 2E:
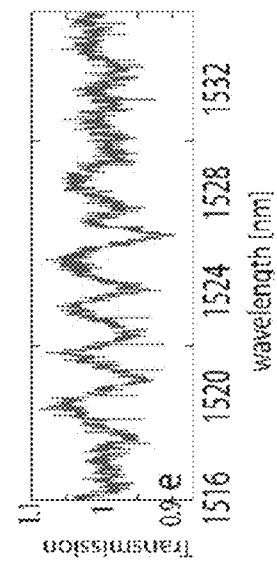
Figure 3B:
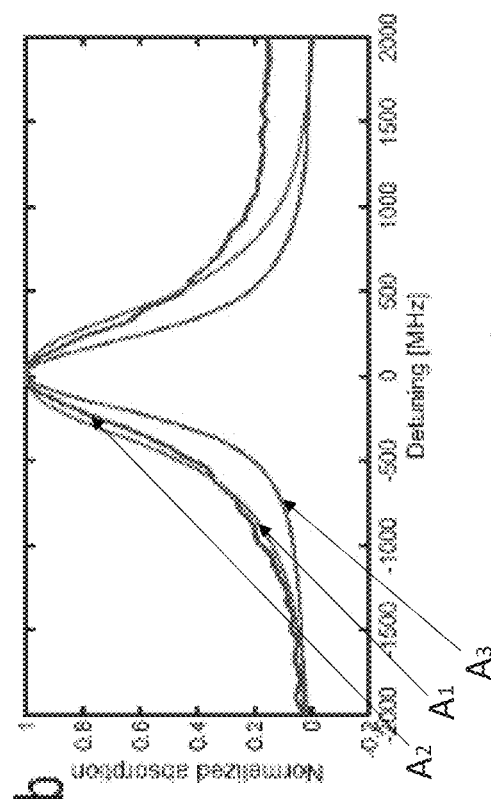
FIG. 3b is a graphical representation showing a normalized absorption from the reference cell, the system of the example shown in FIG. 2a and the glass cap.
Figure 3A:
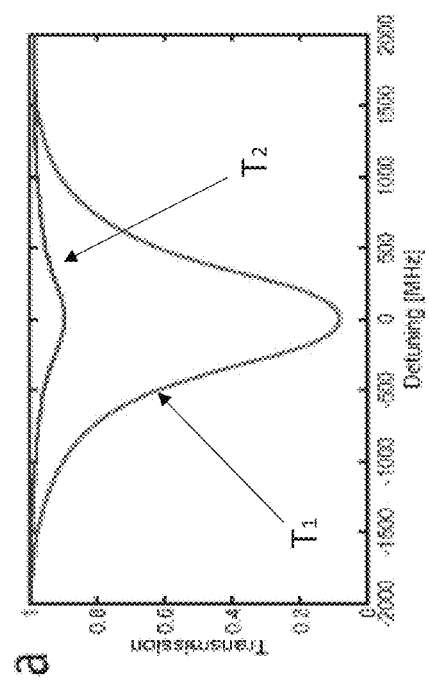

Reference is made to FIG. 2a illustrating a specific implementation of the integrated frequency referencing system of the present invention. In this specific and non-limiting example, the integrated frequency referencing system is implemented as a MCWG and includes optical fibers F used to couple the optical signal into and out of the chip, however the present invention is not limited to this configuration and the coupling of the input optical signal may be performed directly form the light source into the waveguide and from the waveguide to the photodetector. In this specific and non-limiting example, the integrated frequency referencing system comprises a 36 mm long $Si_3N_4$ core waveguide on top of a $SiO_2$ layer. The waveguide cross section has 1.5 μm width and 0.25 μm height and is covered with 2 μm thick $SiO_2$, serving as an upper cladding. Within a predefined area, serving as the interaction region between the molecular gas and the optical mode, the oxide is removed by Buffered HF wet etch. A glass cap is then bonded to the chip. Next, the system is evacuated, filled with $^{12}C_2H_2$ and pinched off. The end result of this process is a portable and hybrid molecular-frequency referencing system which can be seen in FIG. 2b. The TE optical mode supported by the waveguide is presented in FIG. 2c where about 10% of the field extends into the molecular gas and interacts with the acetylene. In FIG. 2d, the light transmission is observed through a 5 cm acetylene reference cell under a pressure of 50 Torr. From the measured transmission, the absorption coefficient ($\alpha$) can be extrapolated using the relation $T=\exp(-\alpha \cdot L)$ where T is the measured transmission, and L is the length of the optical pathway along which light is propagated. By doing so, the absorption coefficient was found to be 0.46 $cm^{-1}$ for the R9 molecular transition of acetylene. From this value, the transmission through the reference cell is expected to be $T=\exp(-\alpha \cdot L \cdot (1-C_F))=0.92$, i.e. an absorption of about 8% is assumed. Here, $C_F=0.9$ is the mode fraction not interacting with the Acetylene, L=36 mm, and the factor 0.5 corresponds to the reduced pressure in the reference cell (26 Torr rather than 50 Torr). In FIG. 2e, one observes the measured transmission through the system of the present invention. In spite of some intensity fluctuations due to modal interference and technical noise, several transitions with about 10% absorption can be still observed, very close to the expected absorption contrast. FIG. 3a shows the measured transmission from the reference cell (curve $T_1$) and from the system implemented in FIG. 2a above (curve $T_2$). The normalized absorptions from the reference cell (curve $A_1$), the system implemented in FIG. 2a above (curve $A_2$) and also the absorption of light that is propagating through the glass cap (curve $A_3$), i.e. perpendicular to the waveguide direction, are shown in FIG. 3b.

Reference is made to FIG. 3c illustrating a locking scheme implemented by the integrated frequency referencing system according some embodiments of the present invention. For sake of comparison, this specific and non-limiting locking scheme comprises a tunable laser L being locked at telecom wavelength (in the example 1550 nm) by a wavelength modulation scheme to the R9 line absorption of the reference cell R. Frequency referencing system 200 comprises a substrate 202, on which an optical pathway enabling propagation for light signals is integrated. In this specific and non-limiting example, the optical pathway is configured as a loop including a laser 210 having an output modulated by an electro-optic frequency modulator structure 204B, at least one optical dielectric waveguide module 204A, a detector 206, and a control feedback drive circuit 208 locking laser 210. More specifically, optical dielectric waveguide module 204A includes a waveguide optically coupled to an atomic vapor cell. The atomic vapor cell accommodates atoms or molecules providing at least one atomic or molecular transition. The waveguide is coupled to a light source being in this specific example a laser 210 being configured and operable to emit at least one input optical signal. The waveguide is configured and operable to enable confinement and propagation of the at least one input optical signal therethrough. The atomic vapor cell is configured and operable to receive the at least one input optical signal from the optical waveguide and is configured and operable to produce a frequency reference signal corresponding to at least one atomic or molecular transition. On the substrate 202 is integrated an electrooptic modulator structure being optically coupled to the laser 210 and being configured and operable to impart a unique identification modulation to the light input signal emitted by laser 210. Laser 210 may be a part of frequency referencing system 200 or not. If laser 210 is a part of frequency referencing system 200, it may be bonded to the substrate or directly integrated onto the substrate. After interaction with the atomic vapor cell, the output light signal is collected by a photodetector 206.

In this specific and non-limiting example, laser 210 is locked by a control feedback drive circuit 208 being responsive to the output signals from the photodetector 206. Control feedback drive circuit 208 includes phase-sensitive detection electronics such as a lock-in amplifier IAA connected to an integrator element or a radio frequency mixer. The integrator element operates as a "memory" device, providing a DC bias such that the laser is always tuned to a wavelength around the resonance. Control feedback drive circuit 208 is configured for receiving the output signal detected by photodetector 206 being in the form of an electrical beat frequency. The detected signal contains the identification modulation corresponding to the reference frequency with which the laser 210 is locked, and this identifier is fed to control feedback drive circuit 208. Laser 210 is controlled by a control feedback drive circuit 208. Control feedback drive circuit 208 enables to lock at least one of the frequencies of the at least one input signal generated by laser 210 to a specific frequency corresponding to the atomic or molecular transition. Control feedback drive circuit 208 is configured to control at least one of a phase, frequency and amplitude of the signal emitted by the laser 210. Control feedback drive circuit 208 is therefore configured and operable to maintain the at least one input optical signal at a substantially constant reference frequency.

Figure 3D:
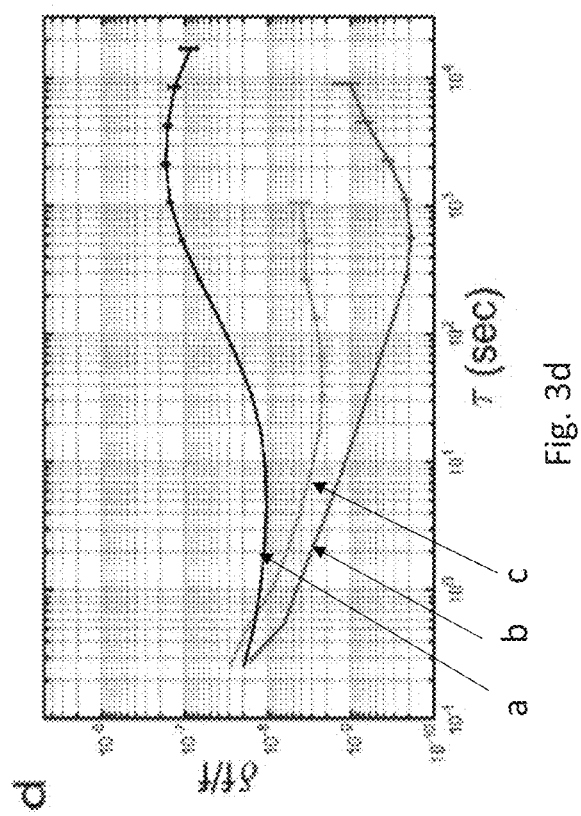
FIG. 3d is a graphical representation showing an Allan deviation extracted from the beating between a laser locked to a reference cell and to a free running laser, a laser locked to another reference cell, and a laser locked to the integrated frequency referencing system of the example shown in FIG. 3c.

The beat signal is measured between the two lasers 210 and L by a counter C and the instability is extracted by Allan deviation. For comparison, the beat signal was also measured between two lasers locked to reference cells, and the beat signal between a laser locked to a reference cell to a free running laser was also measured. The Allan deviation results are depicted in FIG. 3d. The results show laser stabilization to the level of $1.3*10^{-9}$ at 134 seconds. The Allan deviation extracted from the beating between a laser locked to a reference cell and to free running laser is shown by curve a, the laser locked to another reference cell is shown by curve b, and the laser locked by the frequency referencing system of the present invention is shown by curve c. As shown, this result is significantly to better than the stability of the free running laser and is only one order of magnitude inferior to the stability obtained with the large reference cell.

The invention claimed is:

1. An integrated frequency referencing system comprising:
   a substrate;
   an optical pathway being integrated on said substrate and being configured and operable to enable propagation for light signals;
   wherein said optical pathway comprises an electro-optic modulator structure being configured and operable to impart a unique identification modulation to at least one input optical signal emitted by a light source and at least one optical dielectric waveguide being configured and operable to enable confinement and propagation of the at least one input modulated optical signal therethrough; and an atomic vapor cell accommodating atoms or molecules providing at least one atomic or molecular transition; wherein said atomic vapor cell is optically coupled to receive the at least one input modulated optical signal from said optical waveguide and is configured and operable to produce a frequency reference signal corresponding to at least one atomic or molecular transition and wherein the optical coupling between the atomic vapor cell and the at least one optical waveguide comprises an interaction between an optical mode in the optical waveguide and the vapor atoms or molecules via an evanescent tail of the optical mode; so that the frequency referencing system is configured and operable to maintain the at least one input optical signal at a substantially constant reference frequency; wherein said electro-optic modulator structure, said atomic vapor cell and said optical waveguide are rigidly coupled to said substrate forming together a photonic chip scale integrated cell.

2. The integrated system of claim 1, wherein said atomic vapor cell is arranged on the top of said at least one optical waveguide.

3. The integrated system of claim 2, wherein said atomic vapor cell is arranged on the top of or aside of a core of said at least one optical waveguide, such that the vapor of atoms or molecules is configured for operating as a cladding of the optical mode of at least one optical waveguide.

4. The integrated system of claim 1, wherein said atomic vapor cell comprises acetylene molecules providing a plurality of molecular transitions corresponding to a plurality of absorption lines in the electromagnetic spectrum of telecommunication.

5. The integrated system of claim 1, wherein said atomic vapor cell comprises a solid source of alkali vapor capable of being optically or thermally activated.

6. An integrated frequency referencing system comprising:
   a substrate;
   an optical pathway being integrated on said substrate and being configured and operable to enable propagation for light signals;
   wherein said optical pathway comprises an electro-optic modulator structure being configured and operable to impart a unique identification modulation to at least one input optical signal emitted by a light source and at least one optical dielectric waveguide being configured and operable to enable confinement and propagation of the at least one input modulated optical signal therethrough; and an atomic vapor cell accommodating atoms or molecules providing at least one atomic or molecular transition; wherein said atomic vapor cell is optically coupled to receive the at least one input modulated optical signal from said optical waveguide and is configured and operable to produce a frequency reference signal corresponding to at least one atomic or molecular transition; so that the frequency referencing system is configured and operable to maintain the at least one input optical signal at a substantially constant reference frequency; wherein said electro-optic modulator structure, said atomic vapor cell and said optical waveguide are rigidly coupled to said substrate forming together a photonic chip scale integrated cell,
   wherein the at least one optical waveguide comprises an interaction region being configured to couple the optical signal from the interaction region to the atomic vapor cell and back to the waveguide adiabatically.

7. The integrated system of claim 1, wherein said photonic chip scale integrated cell further comprises a photodetector being configured and operable to collect the frequency reference signal.

8. The integrated system of claim 7, wherein said photodetector is bonded or integrated to said substrate.

9. The integrated system of claim 1, wherein said integrated electro-optic modulator structure comprises an electro-optic modulator external to at least one light source wherein the external electro-optic modulator is integrated to the substrate; an electro-optic modulator internal to at least one light source wherein the at least one light source and the internal electro-optic modulator are integrated to the substrate or all the electronics related to modulation being integrated to the substrate.

10. The integrated system of claim 1, wherein said photonic chip scale integrated cell further comprises at least one light source being configured and operable for emitting the light signals.

11. The integrated system of claim 10, wherein said at least one light source is bonded or integrated to said substrate.

12. The integrated system of claim 7, wherein said photonic chip scale integrated cell further comprises a feedback drive circuit being responsive to the output signals from the photodetector to control at least one of a phase, frequency and amplitude of the signal emitted by the at least one light source.

13. The integrated system of claim 10, wherein the at least one light source comprises at least one laser emitting at least one input signal being coupled to said optical pathway; the frequency referencing system being configured and operable to lock at least one of the frequencies of the at least one input signal to a specific frequency corresponding to the atomic or molecular transition.

14. The integrated system of claim 12, wherein said feedback drive circuit is configured to control at least one of a phase, frequency and amplitude of the signal emitted by a laser.

15. The integrated system of claim 1, wherein said photonic chip scale integrated cell further comprises a heater being configured for heating said atomic vapor cell.

16. The integrated system of claim 15, wherein said heater is bonded or integrated to said substrate.

17. The integrated system of claim 1, further comprising a temperature controller being configured for controlling at least one of a temperature and an atomic density of said atomic vapor cell.

18. The integrated system of claim 17, wherein said temperature controller is bonded or integrated to said substrate.

* * * * *